United States Patent [19]

Patel et al.

[11] Patent Number: 4,740,319

[45] Date of Patent: Apr. 26, 1988

[54] OIL BASE DRILLING FLUID COMPOSITION

[76] Inventors: Arvind D. Patel, 6511 Marisol, Houston, Tex. 77083; Carmelita Salandanan, 1686 Creekside Dr., Sugarland, Tex. 77478

[21] Appl. No.: 828,621

[22] Filed: Jan. 29, 1986

Related U.S. Application Data

[63] Continuation of Ser. No. 596,802, Apr. 4, 1984, abandoned.

[51] Int. Cl.$^4$ .............................................. C09K 7/06
[52] U.S. Cl. ............................... 252/8.515; 252/8.511; 524/555; 525/279; 525/296
[58] Field of Search .............. 252/8.5 M, 315.1, 315.4, 252/8.511, 8.515, 8.551; 166/295; 523/130; 524/555, 821, 828; 525/279, 296

[56] References Cited

U.S. PATENT DOCUMENTS

| | | | |
|---|---|---|---|
| 2,552,775 | 5/1951 | Fischer et al. | 252/8.5 |
| 2,697,071 | 12/1954 | Kennedy et al. | 252/8.5 |
| 2,743,233 | 4/1956 | Fisher | 252/8.5 |
| 2,795,545 | 6/1957 | Gluesenkamp | 252/28 |
| 3,366,584 | 1/1968 | Zimmerman | 260/4 |
| 3,379,650 | 4/1968 | Beasley, Jr. et al. | 252/308 |
| 3,472,808 | 10/1969 | Isgur et al. | 524/555 |
| 3,709,819 | 1/1973 | Browning et al. | 252/8.5 P |
| 4,057,683 | 11/1977 | Elting | 526/194 |
| 4,272,426 | 6/1981 | Feast | 524/555 X |
| 4,301,016 | 11/1981 | Carriere et al. | 523/130 X |
| 4,367,297 | 1/1983 | Hubner et al. | 523/130 |
| 4,425,462 | 1/1984 | Turner et al. | 524/400 |
| 4,425,463 | 1/1984 | Walker et al. | 524/400 |

OTHER PUBLICATIONS

"Concise Chemical and Technical Dictionary", H. Bennett (ed.), p. 607 (1974).

Kwok, J. C. and Thompson, R. J., "Characteristics of Styrene-Butadiene Latexes and Their Influence on Beater Addition Process and Products", paper presented at a meeting of the Rubber Division, American Chem. Society, Toronto, CN, 5/10/83, printed in CN, in 4/19/83.

Gray, G. R. et al, *Composition and Properties of Oil Well Drilling Fluids*, 4th ed., pp. 547–576, Gulf Publishing Co., Houston, TX (Aug. 1981).

*Primary Examiner*—Joseph L. Schofer
*Assistant Examiner*—F. M. Teskin
*Attorney, Agent, or Firm*—Arnold, White & Durkee

[57] ABSTRACT

This invention relates to an improved oil-base drilling fluid composition and its use. The improved oil-base drilling fluid composition of this invention is characterized by thixotropic properties which result in a yield point of at least 4.0. The composition includes an oil-base continuous phase and a gelling composition. The gelling composition includes a latex material in combination with one or more functional monomers selected from the group consisting of amides, amines, sulfonates, monocarboxylic acids, dicarboxylic acids and combinations thereof and wherein at least one of the monomers includes a nitrogen containing material.

4 Claims, 1 Drawing Sheet

OIL BASE DRILLING FLUID COMPOSITION

This is a continuation of co-pending application Ser. No. 596,802, filed on 4/4/84, now abandoned.

FIELD OF THE INVENTION

1. Background of the Invention

In the rotary drilling of wells, a fluid is circulated through the borehole and casing to remove cuttings, seal off permeable formations, lubricate the drill bit, and perform other well-known functions. For economic reasons aqueous base drilling fluids (drilling muds) are generally employed, but in many wells invasion of the pay zones by the aqueous continuous phase (water) contained in such muds lowers the permeability of the formations, thus reducing their productivity. Aqueous base muds also may cause serious sloughing of the walls in some boreholes due to the hydrating influence of the water on clay or shale sediments. Furthermore, in coring operations, water invasion destroys the value of the cores for estimating the potential producing capacities of the formations penetrated.

For these and other reasons, it is frequently advantageous to employ special drilling fluids having a non-aqueous continuous phase and further characterized by the property of giving up only relatively small volumes of fluid to permeable formations under the action of differential pressures encountered in well operations. These fluids are usually made by mixing viscosifiers and weighting materials with crude oil or one of its by-products. Such special drilling fluids also require the incorporation of gelling agents for maintaining the mud solids and drill solids in suspension, together with other substances for controlling the fluid loss characteristics.

Heretofore, attempts to regulate the viscosity and fluid loss properties in oil-base drilling fluids with single ingredient gelling agents have not been successful. In present-day practice, special asphaltic materials, organophilic clays, and various soaps are utilized in combination to perform those purposes. Another additive frequently encountered in the past is asbestos fibers. Recently, the use of many such additives has been deemed environmentally unacceptable. Hence, it is also a requirement of current practice that the additives be environmentally acceptable. Large proportions of these additives are required, the asphaltic, organophilic clays or asbestos ingredients alone composing approximately 20% of the weight of the oil-base drilling fluid. Because of the quantities of additives needed and the necessity for adjusting their proportions, the control of the properties of these oil-base fluids is somewhat difficult.

Various advantages of using oil-base drilling muds in rotary drilling of boreholes in the earth over the more common uses of water base drilling muds, have been known for some time. In summary, it can be said that under certain conditions, one or more of the following advantages make oil-base muds more desirable than water-base mud. Drilling fluids weighing less than about eight pounds per gallon can be prepared with an oil-base mud, and have proved advantageous in certain special drilling and coring situations. The penetration of the formation by water is avoided. Cores can be recovered in an in situ condition, and in the presence of hydrous clays and bentonites, no swelling or sloughing is experienced to reduce porosities or cause pipe sticking difficulties.

The principal difficulties encountered in the use of oil-base drilling fluids are probably those of handling, fire hazard, environmental unacceptability and the intrinsic cost per barrel, since oil is much more expensive than water. Most materials which heretofore have been added to oils in order to produce satisfactory drilling muds have been of an intense black color, e.g. carbon black in asphalt of various kinds, and oilfield workers have a strong resistance to handling such materials. Not just any material can be added to an oil for the purpose of making a drilling mud, because the material to be added must not only increase the viscosity, though not to too great an extent, and decrease the fluid loss, but must also be dispersable in the oil, and above all must not be of such a nature as to clog the formations drilled through.

Oil-base drilling fluids have been developed to overcome certain undesirable characteristics of water base muds. These deficiencies are primarily due to the properties of water; specifically, its ability to dissolve salts; to interfere with the flow of oil and gas through porous rocks; to promote the disintegration and dispersion of clays; and to effect corrosion of iron.

In addition to providing a means for avoiding these objections to features of water-base muds, oil-base muds offer potential advantages; better lubricating qualities, higher boiling point, and lower freezing points. Because the cost of preparing an oil mud is always more than that of the same density water mud, the economic justification for selecting an oil mud must come from its superior performance under the particular conditions of use.

There is, however, strong sentiment that although the initial differential costs of oil-base muds versus aqueous-base muds favors aqueous-base, as the well is drilled deeper and as drilling operations last longer the oil-base muds actually become more economical due to the fact that the constituents do not have to be replenished as often and the fact that the oil-base muds are reusable for substantially longer periods of time.

2. The Prior Art

The use of a rubber latex in an oil-base drilling fluid is generally disclosed in U.S. Pat. No. 2,697,071. In addition, U.S. Pat. No. 2,743,233 discloses the hydrogenation of polyene polymers as required for the performance of a polymer in an oil-base drilling fluid.

The addition of polymer materials and in particular latex type materials to water-base drilling muds is disclosed by U.S. Pat. No. 2,552,775. U.S. Pat. No. 2,795,545 discloses organic liquids having incorporated therein adducts of polymeric organic materials for certain solids. Polycations are disclosed as having utility in gel formation in water and/or ion exchange like properties. The patent also relates to organophilic clays in combination with cationic polymers.

U.S. Pat. No. 3,366,584 discloses aqueous dispersions including latexes of natural or synthetic polymers having increased viscosities which contain relatively small amounts of thickening agents. This is primarily a water based disclosure. U.S. Pat. No. 4,057,683 discloses a process for polymerizing a monomer having a reactive vinyl group in the presence of a ceric salt and an inorganic substrate, such as clay. Other patents of general interest include U.S. Pat. No. 3,379,650 discussing a fluid loss controlling agent and U.S. Pat. No. 3,709,819 discussing a specific oil-base drilling fluid additive composition.

More recently, U.S. Pat. No. 4,425,462 issued which teaches the use of a water insoluble neutralized sulfonated elastomeric polymer in combination with a standard oil-base drilling mud. Also, U.S. Pat. No. 4,425,463 teaches the incorporation of a water insoluble neutralized sulfonated thermoplastic polymer and an amine-treated clay in combination with a standard oil-base drilling mud.

According to the teaching of the prior art, a conventional oil-base drilling mud formulation includes an oil, emulsifying agents, wetting agents, water, barite or barium sulfate, asbestos and/or amine-treated clays. Such a formulation is well known in the prior art.

SUMMARY OF THE INVENTION

Drilling Fluid Rheology

The improved oil-base drilling fluid composition of this invention, which includes the novel gelling composition of this invention, provides a drilling mud which exhibits a variety of highly desirable and heretofore unattainable properties. Specifically, the oil-base drilling fluid composition of this invention is thixotropically stable in that the gelling composition added to the oil-base drilling fluid increases the yield point and increases the gel stability without significantly increasing the plastic viscosity of the drilling fluid composition.

Additionally, the oil-base drilling fluid composition of this invention is thermally stable and has enhanced performance characteristics at temperatures which heretofore have resulted in thermal degradation or loss of functional characteristics in most aqueous and oil-base drilling fluids. The components of the oil-base drilling fluid composition of this invention will not contaminate the drilling mud by adding solids since everything included in the oil-base drilling fluid composition is organic in nature. Importantly, the polymer and/or copolymer which forms the gelling composition of this invention is a good fluid loss control agent which suppresses any tendency toward damage to the formation.

Finally, it is essential that the gelling composition and oil-base drilling composition be environmentally acceptable. Oil-base drilling fluids of the prior art containing asphalt, asbestos and other materials have been in large part environmentally unacceptable under current thinking.

An essential characteristic of drilling fluids which is controlled by the additive of this invention is yield point, which has a direct bearing on the apparent viscosity. The apparent viscosity of drilling fluids is very difficult to control because of the adverse conditions under which drilling fluids are used as well as the excessively elevated temperatures to which they will be exposed. In this regard, during the drilling of certain deep wells, i.e., greater than 15,000 feet, it is common for the drilling fluid to be exposed to temperatures at which thermal decomposition of certain additives occurs. These temperatures can easily cause a severe change in the apparent viscosity of the drilling fluid and thus adversely affect the flow characteristics of the drilling mud and adversely affect the overall drilling operation. Such viscosity modification at these temperatures is not acceptable in normal drilling fluids. Additionally, certain areas of the country have excessive geothermal activity resulting in extremely high temperatures. The same effect can be had on drilling fluids at these geothermally elevated temperatures as in deep wells. In any event it is necessary that the apparent viscosity of the drilling fluid be controlled within desired ranges, which are in many instances dependent on the geographic area of activity. The apparent viscosity is a function of plastic viscosity and yield point. As a general rule, as the mud weight increases, the plastic viscosity increases, but the yield point is allowed to increase by a much smaller magnitude.

A second essential characteristic is the gel strength of the drilling fluid. Gel strength is a characteristic of the drilling fluid which reflects the ability of the drilling fluid to maintain a suspension of additives and drill cuttings, especially when circulation is stopped. As can be appreciated, if circulation of the drilling fluid is terminated, and if all of the suspended cuttings and additives to the drilling fluid were then permitted to settle to the lowest point an intolerable situation would be encountered and in all likelihood the drill string would be broken and the bit lost.

Ideally, the drilling fluid gel strength should be just high enough to suspend barite and drill cuttings when circulation is stopped. Higher drilling fluid gel strengths are undesirable because they retard the separation of cuttings and of entrained gas at the surface, and also because they raise the pressure required to reestablish circulation after changing bits. Furthermore, when pulling pipe, a high gel strength may reduce the pressure of the mud column beneath the bit because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may, when conditions are critical, cause induced fracturing with consequent loss of circulation. Methods have been developed for calculation of the magnitude of these pressure surges.

Another essential function of the drilling fluid is its ability to seal permeable formations exposed by the bit with a thin low permeability filter cake. In order for a filter cake to form it is essential that the drilling fluid contain particles of a size only slightly smaller than that of the pore openings of the formation. These particles are trapped in the surface pores while finer particles are carried deeper into the formation. The particles which are deposited on the surface of the formation are known as the filter cake.

It is essential to control the permeability of the filter cake. This permeability depends on the particle size distribution of solids suspended in the drilling fluid and on electrochemical conditions. In general, the more particles there are in the colloidal size range, the lower the cake permeability. Filtration performance in the well is routinely judged by means of the standard American Petroleum Institute filtration test. In this test, the mud is subjected to static filtration through filter paper for thirty minutes, and the volume of filtrate and the cake thickness are then measured. Within any specific drilling fluid and drilling system it is necessary to carefully control the filtrate loss within predesigned tolerance ranges. These tolerance ranges will vary from geographic area to geographic area depending on the type of formations encountered.

During drilling operations, it is always anticipated that the drilling fluid will be contaminated with various materials. Some of the potential contaminants are damaging to the ionic balance and viscosity properties of the drilling fluid.

For purposes of this application several terms require definition. The term thixotropy is defined as a reversable isothermal transformation of a colloidal sol to a gel. In the case of aqueous drilling muds, the phenomenon is caused by clay platelets slowly arranging themselves in positions of minimum free energy in order to satisfy electrostatic surface charges. After a period of rest, a thixotropic mud will not flow unless the applied stress is greater than the strength of the gel structure. In other words, the gel strength becomes the yield point. Thixotropic fluids are said to be fluids with a memory.

The yield point of drilling muds is obtained by measurement on commercially available direct indicating viscometers. The yield point of a fluid is obtained by subtracting the plastic viscosity from the selected rpm shear rate reading on a direct indicating viscometer. In general terms, the yield point refers to the Bingham plastic flow properties of the drilling fluid. A discussion of the yield point characteristics of drilling fluids is found in a treatise entitled *Composition and Properties of Oil Well Drilling Fluids*, 4th Edition, George R. Gray and C. H. Darley, Gulf Publishing Company, 1980. Yield points of at least 4.0 are attainable using the gelling composition and improved oil-base drilling fluid of this invention.

One of the most important indicators of drilling mud rheology is "gel strength." Gel strength is interrelated to plastic viscosity, the yield point and the apparent viscosity. Knowledge of these parameters provides the information necessary for the day-to-day control of drilling mud viscosity. The yield point and gel strengths of water base muds are largely dependent upon the presence of colloidal clays and on contamination by inorganic salts. When measured, the difference between the initial gel strength and that taken after a ten-minute rest period may be used to judge how thick the mud will be during round trips in the well.

If the gel strength of water base muds is too low, it may be increased by adding bentonite. Ideally, the gel strength should be just high enough to suspend barite and drill cuttings when circulation is stopped. Higher gel strengths are undesirable because they retard the separation of cuttings and of entrained gas at the surface, and also because they raise the pressure required to reestablish circulation after changing bits. As discussed above, the gelling composition of this invention provides the necessary yield point and gel strength characteristics to the drilling fluid composition of this invention.

DESCRIPTION OF THE PREFERRED EMBODIMENTS

The Oil-Base Continuous Phase

Figure 1:
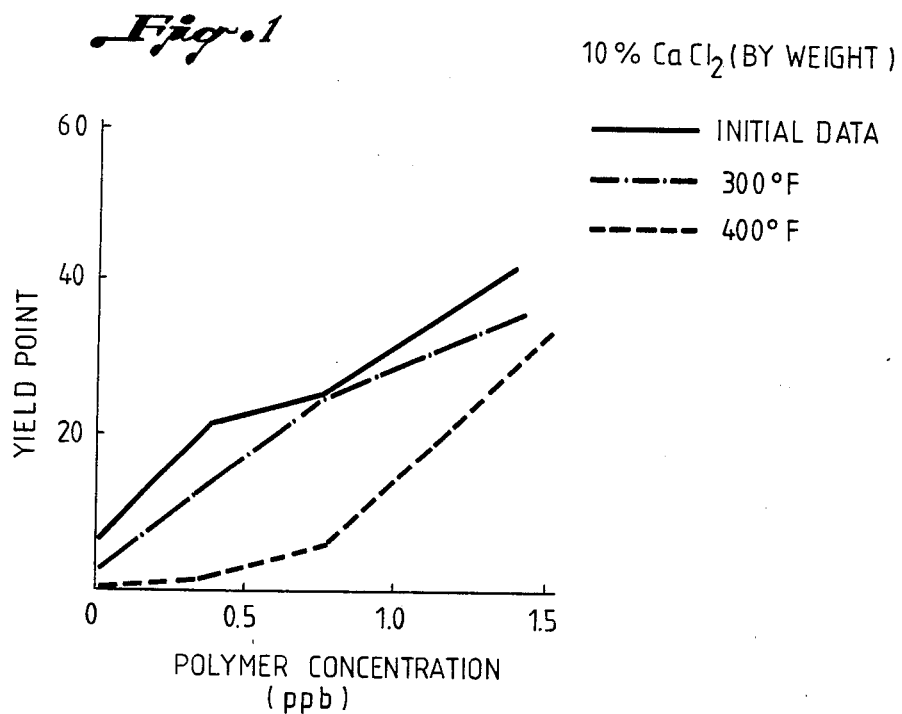
FIG. 1 is a graph illustrating comparison of the yield points of the oil-base mud of Example 12 which had been treated with various concentrations of the polymer described in Example 3, and subsequently aged at various temperatures.

The oils which have shown utility as the continuous phase in the oil-base drilling fluid compositions of this invention are usually petroleums, although other oleaginous materials such as vegetable and animal oils can be used though seldom with economic advantage. The oils in any event should contain at least some material boiling above the gasoline boiling range, i.e. above 400° F. at atmospheric pressure. Oils with too high a content of highly volatile hydrocarbons in the gasoline boiling range are undesirable because of fire hazard, and because of the low viscosity. Preferred oils are topped crude oils, gas oils, kerosene, mineral oils, diesel fuels and the like.

Typically, emulsifiers, i.e. one or more, are added to the continuous oil phase to enhance the functional characteristics. Emulsifiers are generally present to permit the presence of some water in the oil-base mud. These emulsifiers are generally proprietary in nature and conveniently available through normal trade channels.

The Gelling Composition

An organic gelling composition is added to the oil-base continuous phase of this invention to provide the necessary thixotropic properties. It is essential that this results in a yield point of at least 4.0. The gelling composition of this invention can also be described as a copolymer which includes two primary components.

The first component is a latex type material which has a low temperature glass transition state. The glass transition state of a polymer can be described as a narrow temperature interval during which the physical state of the polymer undergoes a profound change from elastomeric state to a hard glassy solid state upon cooling. This phenomenon is reversible. The introduction of bulky substituents, such as styrene, close to the polymer chain would be expected to increase the polymer chain stiffness and elevate the glass transition temperature. Depending on the desired end use of the polymer, styrene can be added to the latex material. The addition of styrene is especially useful in high temperature applications of the drilling muds of this invention; however, at lower temperatures diene polymers can be used. Optionally styrene can be added up to a level which is functionally effective for the desired end use. The preferred material is a styrene-conjugated diene combination. The most preferred is a styrene-butadiene combination. Other materials which have shown utility as the latex material for use in this invention are: butadiene, isoprene, butadiene-methacrylate, butadiene-ethylacrylate, isoprenestyrene and similar materials. In the preferred embodiment of this invention the general molecular weight of the polymer is from 5,000 to 1,000,000 and in the most preferred embodiment from 20,000 to 500,000.

The second component consists of one or more functional monomers which are added to the latex material to enhance the functional characteristics. The functional monomers are selected from the group consisting of amides, amines, sulfonates, monocarboxylic acids, dicarboxylic acids and combinations thereof. It is essential that at least one of the functional monomers be a nitrogen containing material and thus be selected from the group consisting of amides and amines. The most preferred combination of functional monomers would be the combination of a nitrogen containing monomer selected from the amides and/or amines in combination with one or more acid functionalities selected from the group consisting of monocarboxylic acids, dicarboxylic acids and combinations thereof.

The latex material is functionally modified by the addition of one or more functional monomers in the amount of from about 0.5% to about 15% (all percents represent percent by weight unless otherwise noted). Preferably, the range of addition is 1.0% to 10% and most preferably 1.5% to 5%. These ranges may be varied depending on the precise nature of the formation that is penetrated during the drilling operations.

The amides which have shown utility in forming the gelling composition of this invention include but are not limited to acrylamide, N-methylolacrylamide, N-alkylacrylamide, N-vinylacetamide, N-vinylpyrrolidone, N-vinyl-N-methylacetamide and vinylformamide.

The amines which have shown utility in the practice of this invention include N-vinylimidazole, vinylpyridine, combinations thereof and similar materials. The essential characteristic of the amines having utility in this invention is the inherent nitrogen functionality. Therefore, many commercially available amines are functional in the process and products of this invention.

The sulfonates include 2-acrylamido-2-methylpropane sulfonic acid, vinylsulfonate, 2-sulfoethylmethacrylate and styrene sulfonic acid.

Monocarboxylic acids which have been used in the gelling composition of this invention include acrylic acid and methacrylic acid while the dicarboxylic acids which have shown utility include maleic acid, fumaric acid, tetrahydrophthalic acid, itaconic acid, crotonic acid and combinations thereof.

In its broadest form, any one or more of the amides, amines, sulfonates, monocarboxylic acids or dicarboxylic acids which have been previously discussed can be incorporated in the latex material to form the gelling composition of this invention. In the preferred form of this invention at least one of the functional monomers incorporated in the basic polymer is a nitrogen containing monomer while in the most preferred embodiment the functional monomers added include a combination of two or more of the listed functional groups wherein at least one of the added functional groups includes a nitrogen monomer. Examples of preferred nitrogen containing materials include: acrylamide, methylacrylamide, vinylamidizole, vinylpyridine, vinylacetamide, vinylpyrrolidone, vinylforamide and similar such materials such as those disclosed herein before.

In the preferred functionality containing latexes of this invention, the following formula at a polymerization temperature of approximately 80° C. is generally used: styrene is added at 42 to 60 parts by weight, butadiene is added at up to 50 parts per weight, functional monomer is added at up to 13 parts by weight, alkyl mercaptan is added at 0 to 1 part by weight, de-ionized water is added at 90 to 120 parts by weight, synthetic emulsifier is added at 1 to 3 parts by weight and ammonium persulphate is added at 0.3 to 0.6 parts by weight.

A wide selection of functional monomers and synthetic emulsifiers can be used to give functional latexes of different polymeric and colloidal characteristics which would influence the application performance to different degrees.

EXAMPLES

EXAMPLE 1

An oil base mud was formulated and included the following components:

| | |
|---|---|
| 242.00 ml. | diesel oil #2 |
| 32.54 ppb. | OilFaze (Commerical additive marketed by the Magcobar Division of Dresser Industries, Inc., hereinafter "Magcobar") |
| 1.00 ppb. | SE-11 (Emulsifier from Magcobar) |
| 1.00 ppb. | DV-33 (Wetting agent from Magcobar) |
| 26.6 ppb. | water |
| 237 ppb. | barite |

The use of this formula which has a density of 12 ppg (pounds/gallon) gave the results recorded in Table I. The mud was heat-aged for 16 hours in a rotating oven at the temperatures indicated.

TABLE I

| Temperature (°F.) | Plastic Viscosity | Yield Point | Gels 10 sec. | Gels 10 min. |
|---|---|---|---|---|
| Initial | 25 | 15 | 11 | 23 |
| 200 | 20 | 5 | 2 | 5 |
| 300 | 24 | 4 | 5 | 28 |
| 400 | 15 | 0 | 0 | 15 |
| 450 | 17 | −1 | 0 | 3 |

EXAMPLE 2

The oil-base drilling mud of Example 1 was supplemented by the addition of a copolymer derived from styrene (25 parts by weight) and butadiene (75 parts by weight) at a polymer concentration of 2.5 ppb. The results of the use of this drilling mud are recorded in Table II.

TABLE II

| Temperature (°F.) | Plastic Viscosity | Yield Point | Gels 10 sec. | Gels 10 min. |
|---|---|---|---|---|
| Initial | 34 | 7 | 5 | 9 |
| 200 | 35 | 4 | 3 | 7 |
| 300 | 34 | 2 | 2 | 2 |
| 400 | 30 | 0 | 2 | 3 |

EXAMPLE 3

The oil-base drilling mud of Example 1 was supplemented by the addition of a polymer derived from:

| | |
|---|---|
| styrene | 25 |
| butadiene | 72 |
| acrylamide | 2.0 |
| itaconic acid | 1.2 | at a polymer concentration of 2.5 ppb. The results of the use of this drilling mud are recorded in Table III.

TABLE III

| Temperature (°F.) | Plastic Viscosity | Yield Point | Gels 10 sec. | Gels 10 min. |
|---|---|---|---|---|
| Initial | 32 | 25 | 8 | 15 |
| 200 | 37 | 27 | 7 | 15 |
| 300 | 40 | 37 | 9 | 24 |
| 400 | 34 | 30 | 7 | 15 |
| 450 | 31 | 14 | 3 | 9 |

EXAMPLE 4

The oil-base drilling mud of Example 1 was supplemented by the addition of a polymer derived from:

| | |
|---|---|
| styrene | 25 |
| butadiene | 72 |
| acrylamide | 2.0 |
| itaconic acid | 1.2 | at a polymer concentration of 2.5 ppb. The results of the use of this drilling mud are recorded in Table IV.

TABLE IV

| Temperature | Plastic | Yield | Gels | |
|---|---|---|---|---|
| (°F.) | Viscosity | Point | 10 sec. | 10 min. |
| Initial | 37 | 31 | 10 | 18 |
| 200 | 34 | 27 | 8 | 21 |
| 300 | 39 | 24 | 7 | 14 |
| 400 | 26 | 18 | 4 | 14 |

EXAMPLE 5

The oil-base drilling mud of Example 1 was supplemented by the addition of a polymer derived from:

| | |
|---|---|
| styrene | 25.0 |
| isoprene | 71.0 |
| tetrahydrophthalic acid | 2.0 |
| vinylacetamide | 2.0 | at a polymer concentration of 2.5 ppb. The results of the use of this drilling mud are recorded in Table V.

TABLE V

| Temperature | Plastic | Yield | Gels | |
|---|---|---|---|---|
| (°F.) | Viscosity | Point | 10 sec. | 10 min. |
| Initial | 31 | 23 | 9 | 15 |
| 200 | 29 | 16 | 5 | 14 |
| 300 | 30 | 20 | 9 | 16 |
| 400 | 20 | 4 | 2 | 14 |

EXAMPLE 6

The oil-base drilling mud of Example 1 was supplemented by the addition of a polymer derived from:

| | |
|---|---|
| styrene | 25.0 |
| isoprene | 71.8 |
| tetrahydrophthalic acid | 1.2 |
| vinylimidazole | 2.0 | at a polymer concentration of 2.5 ppb. The results of the use of this drilling mud are recorded in Table VI.

TABLE VI

| Temperature | Plastic | Yield | Gels | |
|---|---|---|---|---|
| (°F.) | Viscosity | Point | 10 sec. | 10 min. |
| Initial | 33 | 22 | 8 | 17 |
| 200 | 30 | 18 | 4 | 14 |
| 300 | 31 | 24 | 8 | 16 |
| 400 | 22 | 4 | 1 | 10 |

EXAMPLE 7

The oil-base drilling mud of Example 1 was supplemented by the addition of a drilling fluid additive formulation which includes styrene and styrene sulfonate. The results of the use of this additive at a concentration of 2.5 ppb are recorded in Table VII.

TABLE VII

| Temperature | Plastic | Yield | Gels | |
|---|---|---|---|---|
| (°F.) | Viscosity | Point | 10 sec. | 10 min. |
| Initial | 18 | 9 | 5 | 7 |
| 200 | 20 | 0 | 1 | 2 |
| 300 | 21 | 3 | 2 | 7 |

EXAMPLE 8

The oil-base drilling mud of Example 1 was supplemented by the addition of a polymer derived from:

| | |
|---|---|
| styrene | 25.0 |
| isoprene | 72.0 |
| sodium styrene sulfonic acid | 3.0 | at a polymer concentration of 2.5 ppb. The results of the use of this drilling mud are recorded in Table VIII.

TABLE VIII

| Temperature | Plastic | Yield | Gels | |
|---|---|---|---|---|
| (°F.) | Viscosity | Point | 10 sec. | 10 min. |
| Initial | 30 | 10 | 4 | 6 |
| 200 | 32 | 6 | 2 | 4 |
| 300 | 39 | 6 | 2 | 4 |

EXAMPLE 9

The oil-base drilling mud of Example 1 was supplemented by the addition of a polymer derived from:

| | |
|---|---|
| styrene | 25.0 |
| isoprene | 73.0 |
| styrene sulfonate | 1.0 |
| acrylamide | 2.0 | at a polymer concentration of 2.5 ppb. The results of the use of this drilling mud are recorded in Table IX.

TABLE IX

| Temperature | Plastic | Yield | Gels | |
|---|---|---|---|---|
| (°F.) | Viscosity | Point | 10 sec. | 10 min. |
| Initial | 34 | 27 | 7 | 12 |
| 200 | 39 | 50 | 20 | 41 |
| 300 | 40 | 14 | 2 | 7 |

EXAMPLE 10

The oil-base drilling mud of Example 1 was supplemented by the addition of a polymer derived from:

| | |
|---|---|
| styrene | 25.0 |
| isoprene | 73.0 |
| acrylamide | 2.0 | at a polymer concentration of 2.5 ppb. The results of the use of this drilling mud are recorded in Table X.

TABLE X

| Temperature | Plastic | Yield | Gels | |
|---|---|---|---|---|
| (°F.) | Viscosity | Point | 10 sec. | 10 min. |
| Initial | 38 | 13 | 4 | 5 |
| 200 | 46 | 21 | 5 | 15 |
| 300 | 43 | 12 | 2 | 4 |

EXAMPLE 11

An oil-base mud was formulated and included the following components:

| | |
|---|---|
| 226 ml | diesel oil #2 |
| 2.0 g | lime |
| 7.0 g | MAGCO DFL (emulsifier, Magcobar) |
| 2.0 g | MAGCO DWA (wetting agent, Magcobar) |
| 56.0 g | water |
| 30.8 g | calcium choride |
| 213.0 g | wt. material (barite/hematite 80/20 ratio) | to this basic mud 8.0 ppb of VG 69, an organophilic clay marketed by Magcobar, was added. The use of this formula gave the results recorded in Table XI.

TABLE XI

| Temperature | Plastic | Yield | Gels | |
| (°F.) | Viscosity | Point | 10 sec. | 10 min. |
|---|---|---|---|---|
| Initial | 22 | 26 | 14 | 15 |
| 300 | 20 | 22 | 15 | 25 |
| 400 | 17 | 3 | 2 | 4 |
| 450 | 16 | 0 | 1 | 1 |

EXAMPLE 12

The oil-base drilling mud of Example 11 was supplemented by the addition of the polymer used in Example 3 at a concentration of 5 pounds per barrel and 14.5 pounds per barrel of magnesium soap of fatty acids. The use of this formula gave the results recorded in Table XII.

TABLE XII

| Temperature | Plastic | Yield | Gels | |
| (°F.) | Viscosity | Point | 10 sec. | 10 min. |
|---|---|---|---|---|
| Initial | 23 | 9 | 4 | 4 |
| 300 | 42 | 20 | 4 | 10 |
| 400 | 41 | 16 | 4 | 12 |
| 450 | 38 | 14 | 4 | 15 |

EXAMPLE 13

An oil base mud was formulated and included the following components:

| | |
|---|---|
| 174 ml | diesel oil #2 |
| 24.8 g | OilFaze (Drilling Fluid Additive, Magcobar) |
| 2.0 g | MAGCO DFL (emulsifier, Magcobar) |
| 2.0 g | MAGCO DWA (wetting agent, Magcobar) |
| 19.3 ml | water |
| 562 g | wt material (barite/hematite 80/20 ratio) |

Figure 2:
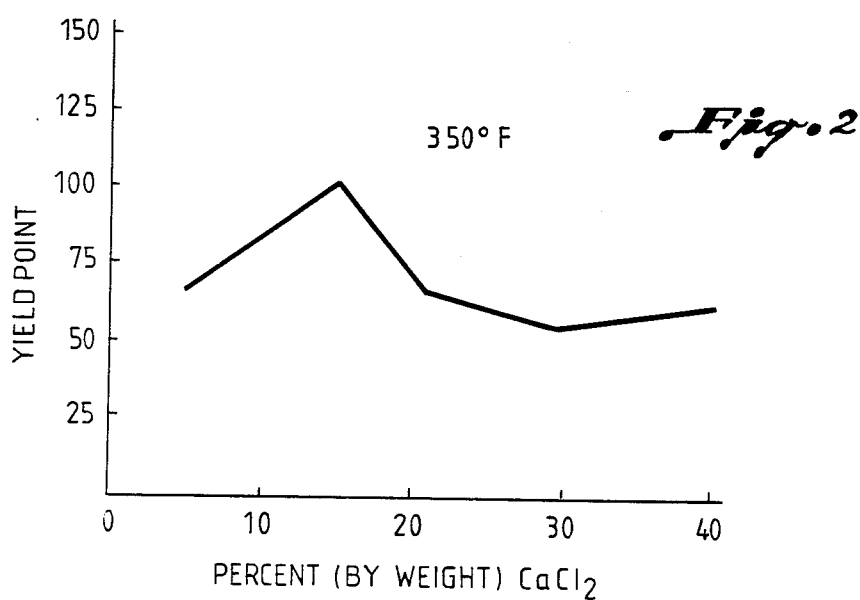
FIG. 2 is a graph illustrating comparison of the yield points of the oil-base mud of Example 13 which had been treated with 2 pounds per barrel of the polymer described in Example 3 and subsequently treated with various amounts of calcium chloride. Each mud was heat-aged at 350° F. for 16 hours before the yield points were measured.

This formulation was tested and yield points at various concentrations of polymer and temperatures were compared. The results appear in FIG. 1. The same material was evaluated for yield point comparisons at various calcium chloride concentrations. The results of this comparison appear in FIG. 2.

What is claimed is:

1. An improved oil-base drilling fluid composition characterized by thixotropic properties resulting in a yield point of from about 10 to about 75 comprising an oil-base continuous phase and a gelling composition, said gelling composition including a latex material copolymerized with one or more functional monomers selected from the group consisting of: amides, amines, sulfonates, monocarboxylic acids, dicarboxylic acids and combinations thereof and wherein at least one of said one or more functional monomers is an amide selected from the group consisting of: acrylamide, N-methylolacrylamide, N-alkyl-acrylamide, vinylacetamide, vinylpyrrolidone, N-vinyl-N-methylacetamide, vinylformamide and combinations thereof.

2. The improved oil-base drilling fluid composition of claim 1 wherein at least two functional monomers selected from the group consisting of: amides, amines, sulfonates, monocarboxylic acids, dicarboxylic acids and combinations thereof are included in said gelling composition and wherein at least one of said at least two functional monomers is an amide selected from the group consisting of: acrylamide, N-methylolacrylamide, N-alkylacrylamide, vinylacetamide, vinylpyrrolidone, N-vinyl-N-methylacetamide, vinylformamide and combinations thereof.

3. An improved oil-base drilling fluid composition characterized by thixotropic properties resulting in a yield point of from about 10 to 75 comprising an oil-base continuous phase, said continuous phase including a crude oil, one or more emulsifiers and a weighting additive to control the density of said drilling fluid in combination with a gelling composition, said gelling composition comprising a latex material copolymerized with one or more functional monomers selected from the group consisting of: amides, amines, sulfonates, monocarboxylic acids, dicarboxylic acids and combinations thereof and wherein at least one of said one or more functional monomers is an amide selected from the group consisting of: acrylamide, N-methylolacrylamide, N-alkylacrylamide, vinylacetamide, vinylpyrrolidone, N-vinyl-N-methylacetamide, vinylformamide and combinations thereof.

4. The improved oil-base drilling fluid composition of claim 3 wherein at least two functional monomers selected from the group consisting of: amines, amides, sulfonates, carboxylic acids, dicarboxylic acids and combinations thereof are included in said gelling composition and wherein at least one of said two functional monomers is an amide selected from the group consisting of: acrylamide, N-methylolacrylamide, N-alkylacrylamide, vinylacetamide, vinylpyrrolidone, N-vinyl-N-methylacetamide, vinylformamide and combinations thereof.

* * * * *